No. 784,480. PATENTED MAR. 7, 1905.
G. W. DISNEY.
CULTIVATOR ATTACHMENT.
APPLICATION FILED JULY 25, 1904.
2 SHEETS—SHEET 1.
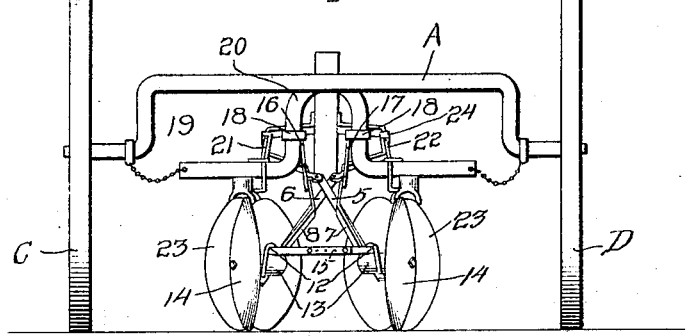
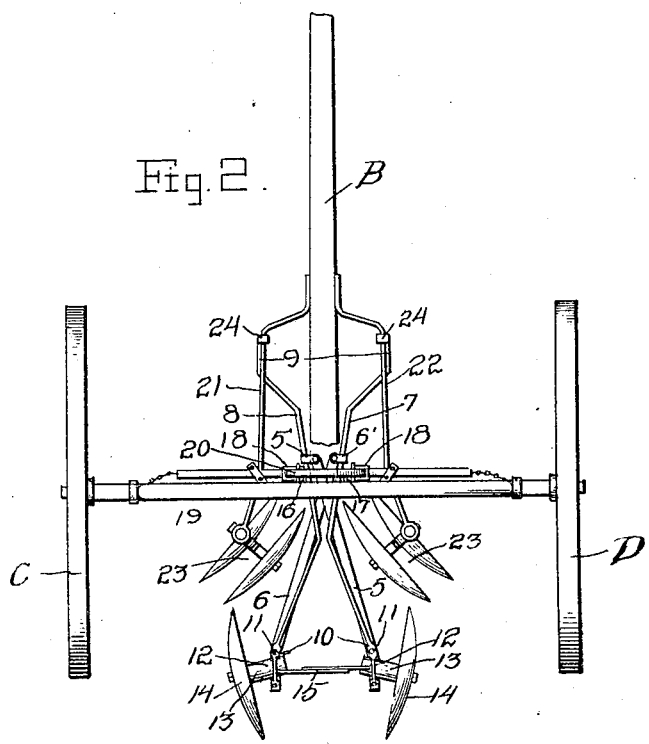
Witnesses
E. K. Reichenbach.
W. C. O. Keyer
Inventor
G. W. Disney.
Attorneys No. 784,480. PATENTED MAR. 7, 1905.
G. W. DISNEY.
CULTIVATOR ATTACHMENT.
APPLICATION FILED JULY 25, 1904.
2 SHEETS—SHEET 2.
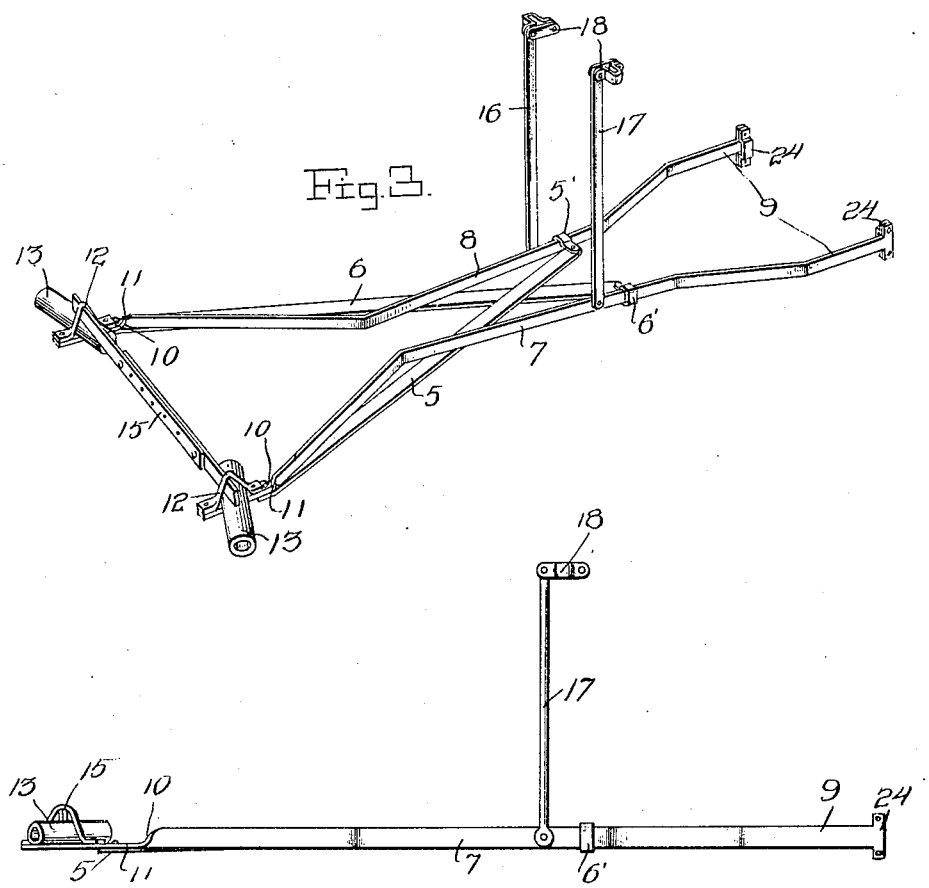

No. 784,480.

Patented March 7, 1905.

UNITED STATES PATENT OFFICE.

GEORGE W. DISNEY, OF RICHLAND, KANSAS.

CULTIVATOR ATTACHMENT.

SPECIFICATION forming part of Letters Patent No. 784,480, dated March 7, 1905.

Application filed July 25, 1904. Serial No. 218,074.

*To all whom it may concern:*

Be it known that I, GEORGE W. DISNEY, a citizen of the United States, residing at Richland, in the county of Shawnee, State of Kansas, have invented certain new and useful Improvements in Cultivator Attachments; and I do hereby declare the following to be a full, clear, and exact description of the invention, such as will enable others skilled in the art to which it appertains to make and use the same.

This invention relates to disk cultivators, and more particularly to attachments therefor, and has for its object to provide an attachment which will be readily applicable to disk cultivators of the type in common use and by means of which when the cultivator is used in the treatment of corn or other plants grown in hills fresh earth may be supplied to the plants, the earth being free from weeds and other refuse matter.

A further object is to provide such an attachment which will be readily adjusted to supply the desired amount of earth to the plant.

Other objects and advantages will be apparent from the following description, and it will be understood that modifications of the specific construction shown may be made and any suitable materials may be used without departing from the spirit of the invention.

In the drawings forming a portion of this specification, and in which like characters of reference indicate similar parts in the several views, Figure 1 is a rear elevation of the cultivator provided with the present invention. Fig. 2 is a top plan view of the cultivator with some of the upper portions thereof removed to more clearly show the present invention. Fig. 3 is a perspective view of the present invention removed from the cultivator. Fig. 4 is a side elevation of Fig. 3.

Referring now to the drawings, the present invention comprises two plates 5 and 6, which are crossed adjacent to their forward ends and which have secured thereto at their forward ends yokes 5' and 6', in which are disposed metallic plates 7 and 8, the broad dimensions of which extend vertically. At both sides of the yokes 5' and 6' the plates 7 and 8 are turned diagonally away from each other, and beyond these diagonal portions the plates are again turned at an angle to lie parallel to each other, as shown at 9 and 10. The parallel portions 10 of the two plates, which are at the rearward ends thereof, are given half-turns, as shown at 11, to bring their broad dimensions horizontal, and these portions 10 are secured adjacent to the turns 11 to the rearward ends of the plates 5 and 6, the portions 10 extending beyond the rearward ends of these plates and having upwardly-extending yokes 12 secured thereto, in which are engaged the bearing-boxes 13 of ground-treating disks 14, which are disposed with their rearward edges directed toward each other.

Secured at its ends to the yokes 12 is a longitudinally-adjustable space-rod 15, by means of which the distance between the disks 14 may be varied to suit different conditions, and secured to the plates 7 and 8, just rearward of the yokes 5' and 6', are a pair of vertical rods 16 and 17, having clamps 18 at their free ends for a purpose to be presently described.

The cultivator shown in the drawings comprises a framework 19, which includes the usual central arch-shaped member 20 and the forwardly-extending portions 21 and 22, between which the draft-pole B is mounted, the cultivator being also provided with ground-treating disks 23, which are arranged at opposite sides of the center of the machine with their forward edges directed toward each other. The cultivator also includes an arched axle A, to which the member 20 is connected, and the axle is provided with ground-wheels C and D.

The attachment described above is secured to the cultivator by means of the clamps 18, which are secured to the sides of the arch-shaped member, and by other clamps 24, which are attached to the ends of the parallel portion 9 of the plates 7 and 8 and which are engaged with the forwardly-extending portions 21 and 22 of the cultivator-frame. When thus attached, the disks 14 lie rearwardly of the disks 23, and when the harrow is in use it is driven over the field, the rows of plants passing between the innermost pair of the disks 23 and between the disks 14, the spaces between these two pairs of disks coinciding with each other. It will thus be apparent that the disks 23 will turn the weeds, stones, and other refuse matter away from the rows and that the disks 14 will gather fresh earth from the paths left by the disks 23, which will be free from weeds and other matter and will supply this earth to the plants, thus forming the hills therefor. It will also be apparent that by means of the space-bar 15 the disks 14 may be adjusted toward and away from each other and that the entire attachment may be readily disconnected from and connected to the cultivator when desired.

What is claimed is—

1. The combination with a cultivator including a framework having spaced vertical portions and forwardly-extending portions, and ground-treating devices, of an attachment therefor comprising spaced plates, clamps carried by the forward ends of the plates and engaged with the forwardly-extending portions of the framework, yokes engaged with the plates, crossed plates connected with the yokes at one end and at their other ends to the first-mentioned plates adjacent to their rearward ends, cultivating-disks revolubly connected with the rearward ends of the first-mentioned plates, an adjustable space-rod connected with the rearward ends of the first-named plates and arranged for operation to vary the distance between the cultivating-disks, uprights connected with the first-named plates, and clamps carried by the upper ends of the uprights and engaged with the vertical portions of the cultivator.

2. An attachment for cultivators comprising spaced plates, clamps carried by the forward ends of the plates, supporting-uprights secured to the plates between their ends, clamps carried by the upper ends of the supporting-uprights, brace-plates connected at either end to one of the first-named plates, cultivating-disks carried by the rearward ends of the first-named plates, and a space-rod connected with the first-named plates and arranged for operation to vary the distance between the rearward ends thereof.

In testimony whereof I affix my signature in presence of two witnesses.

GEORGE W. DISNEY.

Witnesses:
H. J. SULLIVAN,
JNO. B. NORRIS.